United States Patent
Chung

(10) Patent No.: US 9,492,032 B2
(45) Date of Patent: Nov. 15, 2016

(54) BI-MODE BARBECUE GRILL DEVICE

(71) Applicant: Kiosky Chung, Taichung (TW)

(72) Inventor: Kiosky Chung, Taichung (TW)

(*) Notice: Subject to any disclaimer, the term of this patent is extended or adjusted under 35 U.S.C. 154(b) by 268 days.

(21) Appl. No.: 14/262,973

(22) Filed: Apr. 28, 2014

(65) Prior Publication Data

US 2015/0305559 A1 Oct. 29, 2015

(51) Int. Cl.
*A47J 37/07* (2006.01)
*A47J 37/04* (2006.01)

(52) U.S. Cl.
CPC ............. *A47J 37/0713* (2013.01); *A47J 37/04* (2013.01); *A47J 37/0786* (2013.01); *A47J 2201/00* (2013.01)

(58) Field of Classification Search
USPC .................................................. 126/36, 25 R
See application file for complete search history.

(56) References Cited

U.S. PATENT DOCUMENTS

| | | | | |
|---|---|---|---|---|
| 4,819,614 A | * | 4/1989 | Hitch | A47J 37/0713 126/25 R |
| 6,000,389 A | * | 12/1999 | Alpert | A47J 37/0713 126/25 R |
| 6,609,512 B2 | * | 8/2003 | Poe, Jr. | A47J 37/074 126/25 A |
| 2003/0177913 A1 | * | 9/2003 | Dellinger | A47J 37/0786 99/339 |
| 2006/0112949 A1 | * | 6/2006 | Ducate, Sr. | A47J 37/0786 126/25 R |
| 2012/0266856 A1 | * | 10/2012 | Zelek | A47J 37/0786 126/25 R |

* cited by examiner

*Primary Examiner* — Avinash Savani

(57) ABSTRACT

A bi-mode barbecue grill device includes a bowl, a gas burner located in the bowl, an ash tray located near the gas burner, a first grill located above the gas burner, a second grill located above the first grill, and a shield located between the gas burner and the first grill. The first grill is used to support coal. The second grill is used to support food. The shield shields the gas burner from ash produced by combustion of the coal supported on the first grill and directs the ash onto the ash tray.

6 Claims, 4 Drawing Sheets

BI-MODE BARBECUE GRILL DEVICE

BACKGROUND OF INVENTION

1. Field of Invention

The present invention relates to a barbecue grill device and, more particularly, to a bi-mode barbecue grill device that can selectively consume coal or gas.

2. Related Prior Art

There are various barbecue grill devices. A type of the barbecue grill devices consumes coal to cook food. Another type of the barbecue grill devices consumes gas to cook food. It is however a burden for a user to buy and keep a coal-based barbecue grill device and a gas-based barbecue grill device.

Therefore, the present invention is intended to obviate or at least alleviate the problems encountered in prior art.

SUMMARY OF INVENTION

It is the primary objective of the present invention to provide a bi-mode barbecue grill device.

To achieve the foregoing objective, the bi-mode barbecue grill device includes a bowl, a gas burner located in the bowl, an ash tray located near the gas burner, a first grill located above the gas burner, a second grill located above the first grill, and a shield located between the gas burner and the first grill. The first grill is used to support coal. The second grill is used to support food. The shield shields the gas burner from ash produced by combustion of the coal supported on the first grill and directs the ash onto the ash tray.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
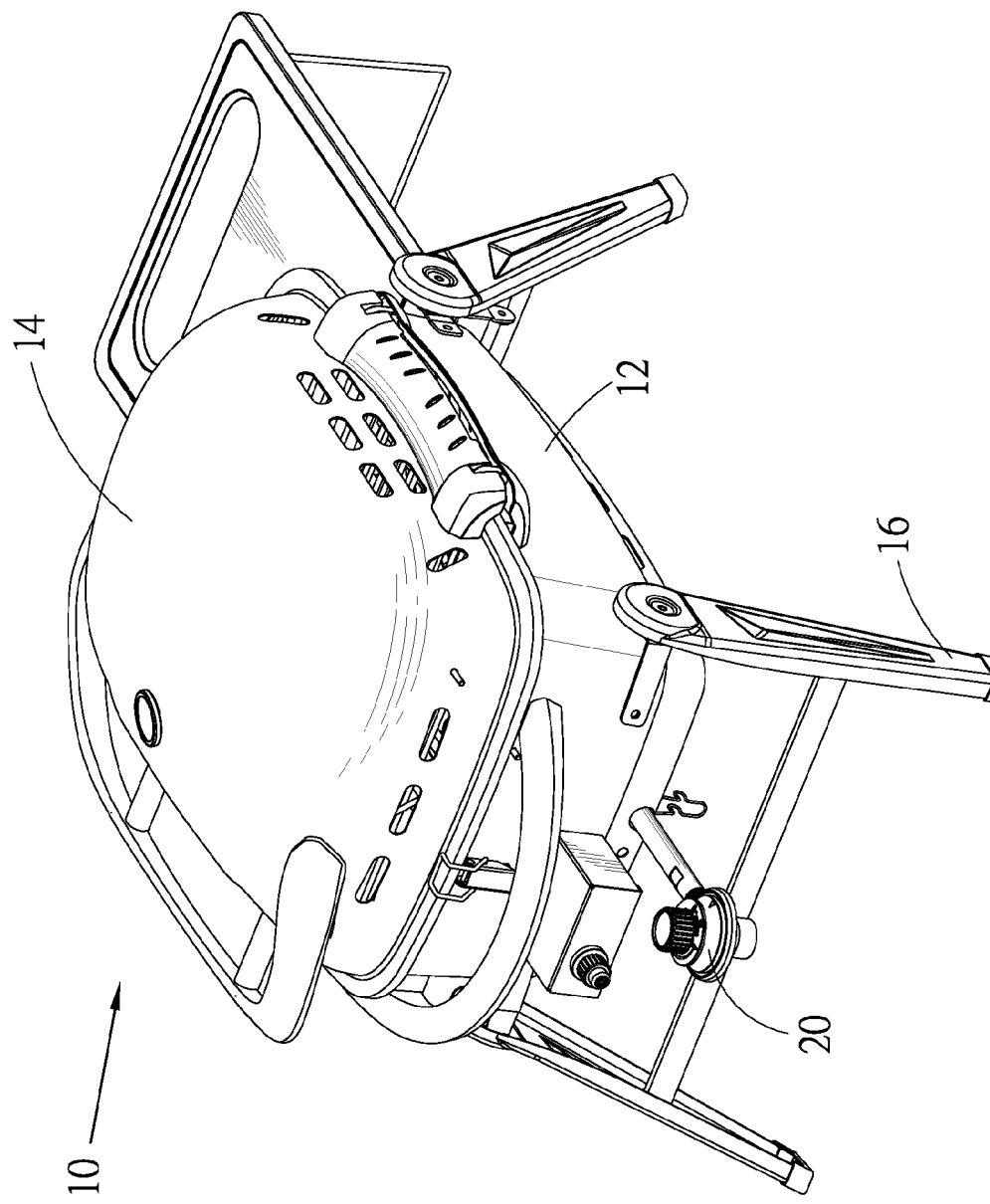
FIG. 1 is a perspective view of a bi-mode barbecue grill device according to the preferred embodiment of the present invention.
Figure 2:
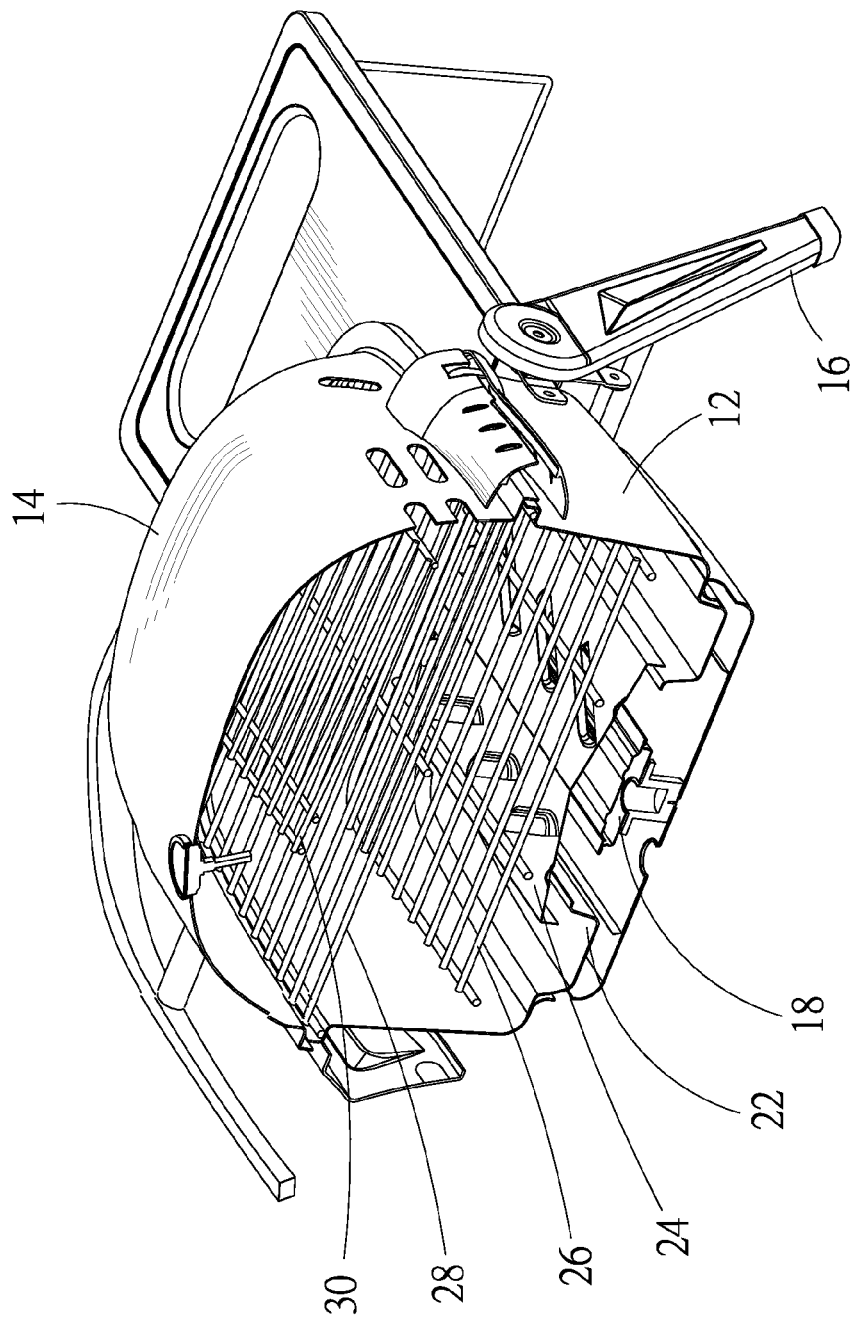
FIG. 2 is a cut-away view of the bi-mode barbecue grill device shown in FIG. 1.
Figure 3:
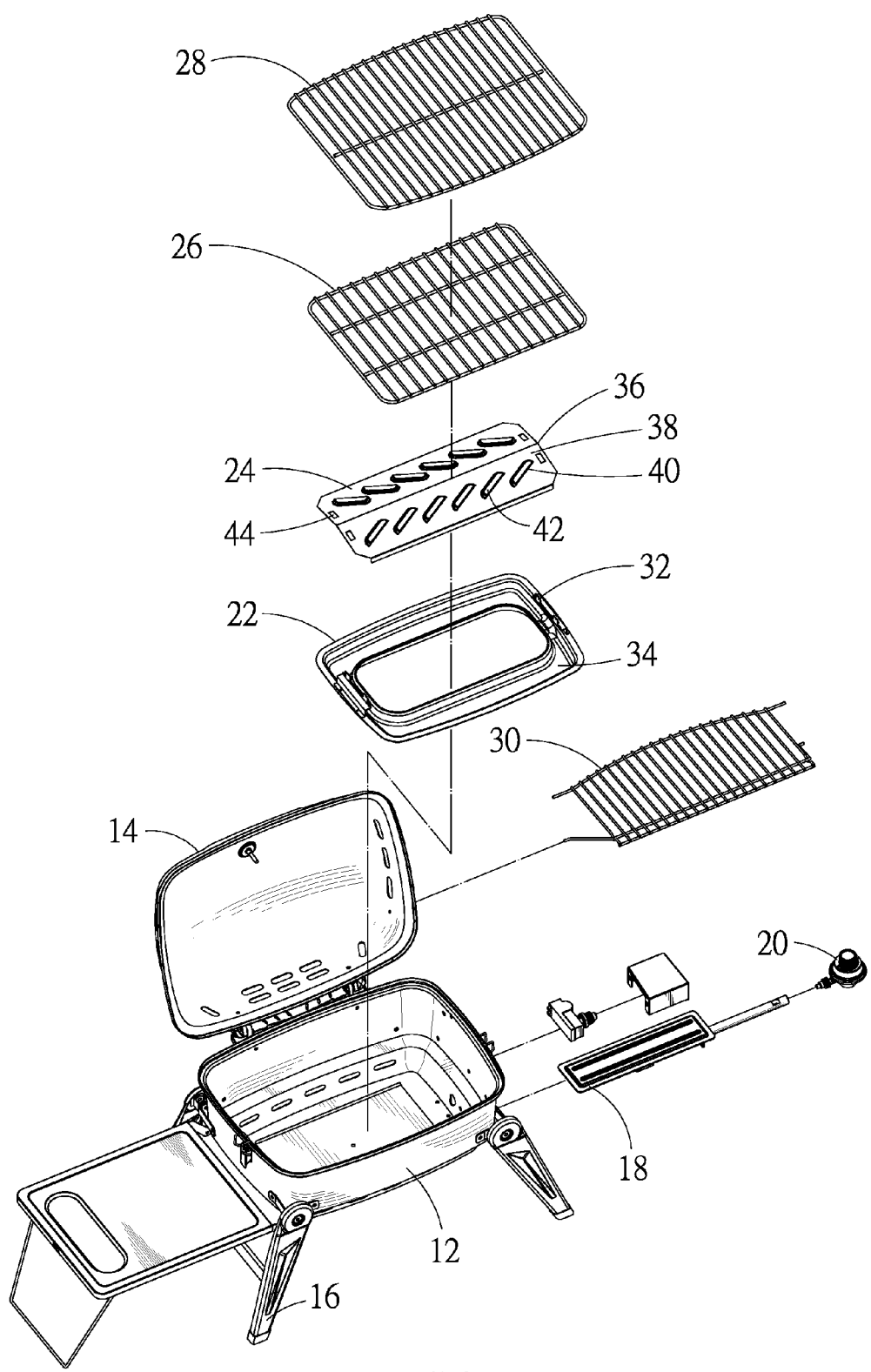
FIG. 3 is an exploded view of the bi-mode barbecue grill device shown in FIG. 1.
Figure 4:
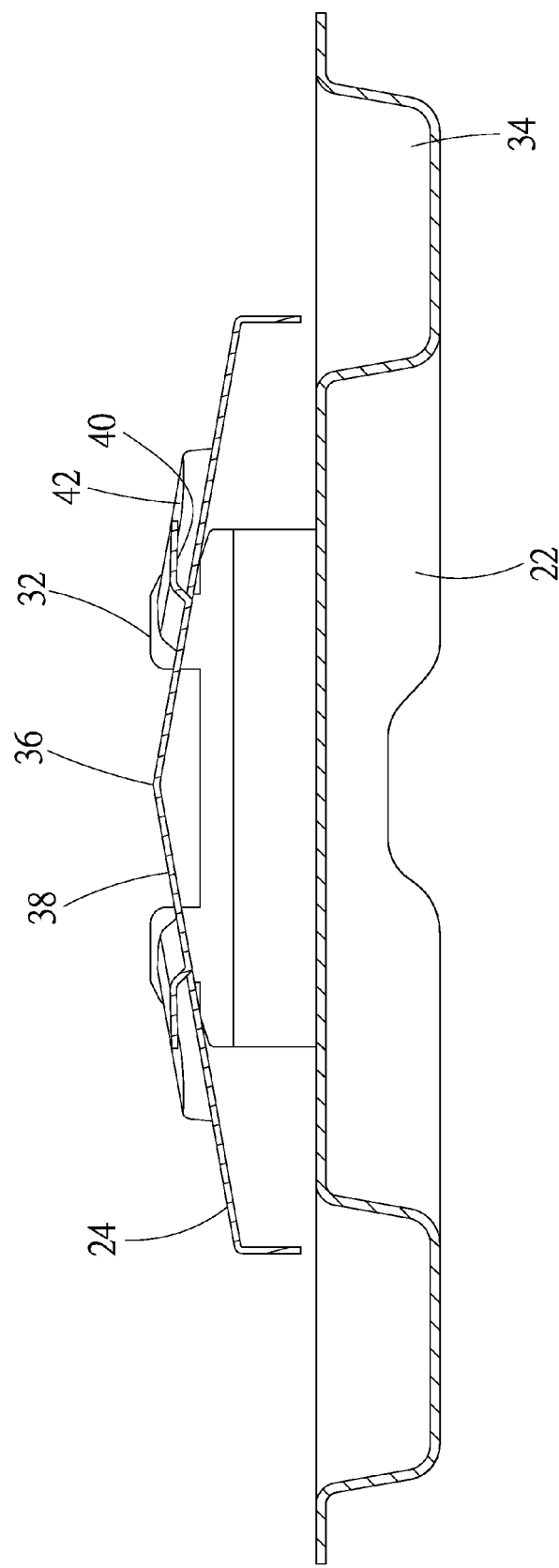
FIG. 4 is an enlarged, partial, cross-sectional view of the bi-mode barbecue grill device shown in FIG. 1.

Referring to FIGS. 1 through 3, there is a bi-mode barbecue grill device 10 according to the preferred embodiment of the present invention. The bi-mode barbecue grill device 10 includes a bowl 12, a lid 14 pivotally connected to the bowl 12, four legs 16 pivotally connected to the bowl 12, a gas burner 18 located in the bowl 12, and a valve 20 in communication with the gas burner 18. The valve 20 is placed out of and connected to the bowl 12. The valve 20 can be connected to a gas tank (not shown) so that gas can be fed into the gas burner 18 from the gas tank through the valve 20.

The bi-mode barbecue grill device 10 further includes an ash tray 22, a shield 24 and three grills 26, 28 and 30. The ash tray 22 is formed with four tabs 32. The ash tray 22 is an annular element that is formed with an annular groove 34. The ash tray 22 is supported on an annular shoulder (not numbered) formed in the bowl 12. The ash tray 22 is located around the gas burner 18.

The shield 24 is shaped like a roof that includes a ridge 36 and two halves 38 that extend from the ridge 36. The shield 24 further includes vents 40 in the form of slots. The vents 40 are sorted into two groups each located in a corresponding one of the halves 38 of the shield 24. The vents 40 are made in the shield 24 by punching so that each of the vents 40 is located below a leaf 42. Each of the leaves 42 includes an edge directed from the ridge 36 so that the vents 40 are directed from the ridge 36, i.e., directed downwards for reasons to be given. The shield 24 further includes four slots 44 made therein.

The shield 24 is supported on the ash tray 22. The slots 44 receive the tabs 32 so that the shield 24 is precisely and firmly located on the ash tray 22. The shield 24 is located above the gas burner 18. The halves 38 of the shield 24 are directed at the annular groove 34.

The first grill 26 is located above the shield 24. The second grill 28 is located above the first grill 26. The third grill 30 is pivotally connected to the lid 14.

The bi-mode barbecue grill device 10 is switchable between a coal-based mode and a gas-based mode. In the coal-based mode, coal is located on the first grill 26. Food is located on the second grill 28. The food is cooked by heat generated from the combustion of the coal. The combustion of the coal inevitably produces ash. The shield 24 shields the gas burner 18 from the ash. It is difficult for the ash, juice or grease of the food to fall onto the gas burner 18 from the first grill 26 due to the direction of the vents 40 and the provision of the leaves 42. Then, the food is moved onto the third grill 30 from the second grill 28. The food is kept warm on the third grill 30.

In the gas-based mode, the gas is fed into the gas burner 18 from a gas tank through the valve 20. Food is located on the second grill 28. The food is cooked by heat generated from the combustion of the gas. The heat is carried by air. The air that is heated travels to the food from the gas burner 18 via the vents 40. It is difficult for grease of the food to fall onto the gas burner 18 from the first grill 26 due to the direction of the vents 40 and the provision of the leaves 42. Then, the food is moved onto the third grill 30 from the second grill 28. The food is kept warm on the third grill 30.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A bi-mode barbecue grill device including:
   a bowl;
   a gas burner located in the bowl;
   an annular ash tray extending around the gas burner;
   a first grill located above the gas burner, wherein the first grill is adapted for supporting coal;
   a second grill located above the first grill, wherein the second grill is adapted for supporting food; and
   a shield located between the gas burner and the first grill and formed with a ridge and two halves tilting towards the annular ash tray from the ridge so that the shield is adapted for shielding the gas burner from ash produced by combustion of the coal supported on the first grill and directing the ash onto the annular ash tray.

2. The bi-mode barbecue grill device according to claim 1, wherein the shield includes at least one vent adapted for directing hot air to the food supported on the first grill from the gas burner.

3. The bi-mode barbecue grill device according to claim 2, wherein the shield includes at least one leaf above the vent.

4. The bi-mode barbecue grill device according to claim 3, wherein the leaf directs the vent towards the ash tray in a downward manner.

5. The bi-mode barbecue grill device according to claim 1, wherein the shield includes a ridge and two halves extending towards the ash tray from the ridge in a downward manner.

6. The bi-mode barbecue grill device according to claim 1, wherein one of the ash tray and the shield includes at least one tab while the other one of the ash tray and the shield includes a slot for receiving the tab to position the shield on the ash tray.

\* \* \* \* \*